(12) United States Patent
Hooper (10) Patent No.: US 8,055,474 B1
(45) Date of Patent: Nov. 8, 2011

(54) DIAGNOSTIC SYSTEMS AND METHODS

(75) Inventor: Adrian R. Hooper, Stoke Hammond (GB)

(73) Assignee: Red X Holdings LLC, Anacortes, WA (US)

( * ) Notice: Subject to any disclaimer, the term of this patent is extended or adjusted under 35 U.S.C. 154(b) by 198 days.

(21) Appl. No.: 11/969,290

(22) Filed: Jan. 4, 2008

Related U.S. Application Data

(63) Continuation of application No. 11/749,540, filed on May 16, 2007, now abandoned.

(60) Provisional application No. 60/801,038, filed on May 16, 2006.

(51) Int. Cl.
*G21C 17/00* (2006.01)

(52) U.S. Cl. ........ 702/183; 702/115; 702/127; 702/182; 702/185

(58) Field of Classification Search .......... 702/182–183, 702/185
See application file for complete search history.

(56) References Cited

U.S. PATENT DOCUMENTS

| 5,210,704 | A | * | 5/1993 | Husseiny | 702/34 |
| 5,557,557 | A | * | 9/1996 | Frantz et al. | 703/22 |
| 2003/0147351 | A1 | * | 8/2003 | Greenlee | 370/232 |
| 2007/0168174 | A1 | * | 7/2007 | Davari et al. | 703/18 |

OTHER PUBLICATIONS

Kaufman, Jerry J., "Functional Analysis System Technique (FAST)," Value Engineering for The Practitioner, 3rd Ed. 1990, pp. 3-1 to 3-23; North Carolina State University, U.S.

* cited by examiner

*Primary Examiner* — Drew A Dunn
*Assistant Examiner* — Mischita Henson
(74) *Attorney, Agent, or Firm* — Kory D. Christensen; Aaron D. Barker; Stoel Rives LLP (57) ABSTRACT

The present invention relates to systems and methods for diagnosing undesirable events or the lack of desirable events representing product or process malfunctions. One aspect of the invention includes a method for determining a cause of a malfunction event in a prototype or production product or process. Another aspect of the invention includes a method for identifying evidence of deviation from a specification for a product or process. Still another aspect of the invention includes a method for ascertaining the reliability of a product or process. The present invention also provides a diagnostic computer system and computer program code for performing various methods embodying different aspects of the present invention. A computer system for training a user to diagnose and apply corrective action to a malfunctioning product or process is also provided.

27 Claims, 9 Drawing Sheets

DIAGNOSTIC SYSTEMS AND METHODS

CROSS-REFERENCE TO RELATED APPLICATION

This patent application is a continuation of U.S. patent application Ser. No. 11/749,540, filed May 16, 2007 now abandoned, which claims priority benefit under 35 U.S.C. §119(e) of U.S. Provisional Patent Application Ser. No. 60/801,038, filed May 16, 2006, the contents of which are incorporated by reference herein in their entirety.

FIELD OF THE INVENTION

The present invention relates to systems and methods for diagnostic analysis, and, more particularly, to systems and methods for the diagnosis of undesirable events and/or lack of desirable events representing product or process malfunctions.

BACKGROUND OF THE INVENTION

Products and processes, including machines, generally perform at least one of four functions related to energy. They can convert energy, transmit energy, contain energy or direct energy. Recognizing that energy can be either destructive or useful, there are generally five energy paths in and out of a specific energy function. These energy paths include: (i) the path of input energy used or purchased to achieve the energy function, (ii) the path of output energy for performing useful work, i.e., the work the machine was intended to perform, (iii) the path of waste energy, or energy loss, typically a function of the second law of thermodynamics, while attempting to perform the useful work, (iv) the path of any input signal energy used to direct other energy paths, and (v) the path of any external input energy from the environment.

Figure 1:
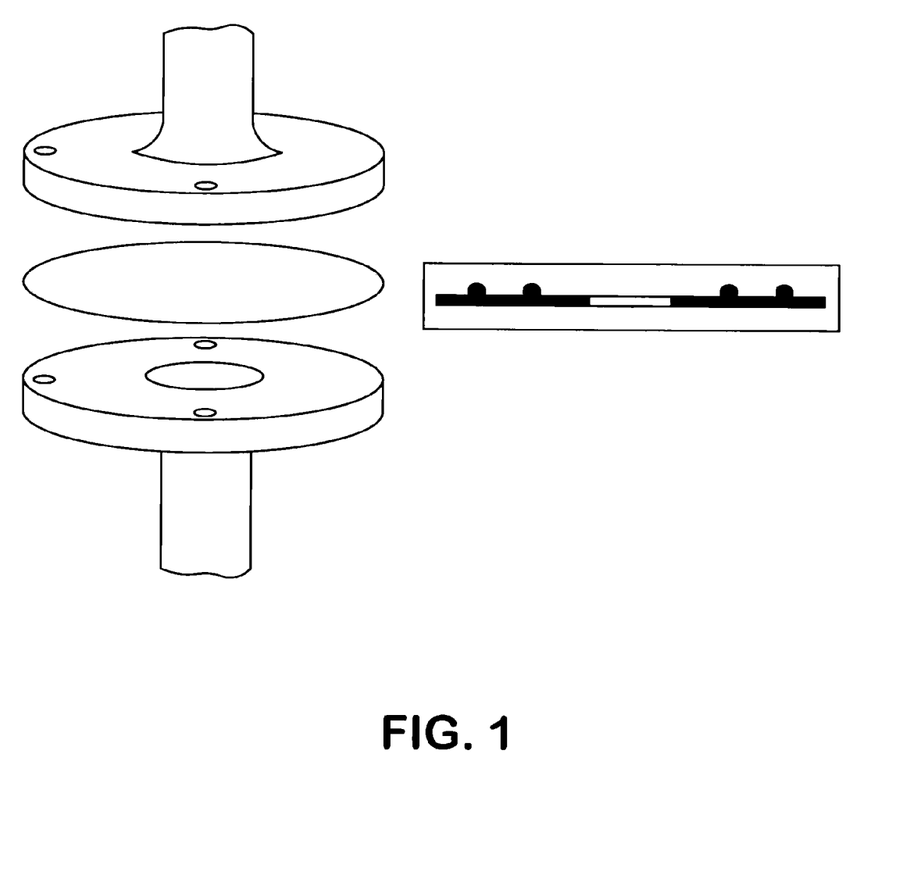
FIG. 1 shows a bolted flange and seal arrangement for which the cause of a fluid leak can be detected using the systems and methods of the present invention.

At times, a machine product or process may generate energy losses or leaks that manifest themselves in the form of vibrations, noise, fluid leaks, overheating or wear. For these energy leak problems, conventional diagnostic and measurement systems typically measure the waste energy itself by measuring the magnitude of vibrations or noise, the leak rate, the time to overheat or the amount of wear. For example, using a traditional approach for diagnosing the cause of a product or process malfunction, the presence of an undesirable event (or the lack of a desirable event), such as a fluid leak in a bolted flange and seal arrangement (FIG. 1), is detected and measured directly with respect to the magnitude of the leak in order to determine the feature or property of the particular component responsible for causing the event. As a result of using this direct measurement approach, two systems that do not leak would appear to have no difference with respect to their tendency to leak.

Traditional approaches for determining the potential reliability of a product or process often expose a group of products or processes to a specific test environment and compare their performance to a requirement. This requirement is often in a "no failures allowed" format. The presence of an undesirable event, such as the fluid leak in the bolted flange and seal arrangement as described above, at any point during the test would be categorized as a failure. As a result, systems which do not experience a leak would appear to have no difference with respect to their tendency to leak and would therefore be thought of as reliable.

Events can be catastrophic (e.g., something breaks) or they can be simple malfunctions. It is possible that a catastrophic failure at a component level can cause a malfunction at a system level. All events, whether catastrophic or malfunctions, are driven by four energy functions, and each of those four energy functions is in turn driven by individual features and/or properties of a product or process, or combinations thereof. Catastrophic events are traditionally difficult to measure because they have occurred in the past. Moreover, traditional methods, including those described above, often rely solely on an attribute measurement system for catastrophic failures (i.e., broken vs. not broken) providing little leverage to converge onto the root cause of the failure.

Therefore, there is a long felt yet unmet need for systems and methods that use an energy function model to identify questions concerning a product or process malfunction, rapidly and easily answer those questions, and isolate the root cause of a malfunction event to a subset of the product or process represented by the energy function model. A series of the questions identified act as a progressive search to converge on the feature or property that can be changed or controlled to manage the energy responsible for the malfunction.

SUMMARY OF THE INVENTION

These and other long-felt but previously unmet needs are addressed, at least in part, by various aspects of the present invention. In one of its primary aspects, the present invention provides systems and methods for identifying the cause of a product or process malfunction by measuring how the product or process is intended to perform in terms of the four basic energy functions and five energy paths. The systems and methods of the present invention convert malfunction events, which may otherwise be difficult to measure, into measurements of energy which are then used to contrast how the product or process is actually performing with how it is intended to perform. A variety of progressively convergent search methods can be applied to the contrast with the specific goal of identifying the key features or properties that control the critical energy functions corresponding to the malfunctions. Unlike the conventional approaches which only measure the magnitude of an energy leak itself, the systems and methods of the present invention may also measure input energy or useful work output energy to detect contrasts.

One aspect of the present invention is an embodiment of a diagnostic method for determining a cause of an event in a product or process. In some embodiments of the present invention, the event comprises a malfunction event. The method provides a schematic of the product or process which can cover the narrowest scope known to contain the root cause of the event, or, if nothing is known, the entire product or process. The method also detects an energy function of the product or process according to how the product or process manages energy during operation. Generally, a product or process can direct energy, transmit energy convert energy or contain energy. With respect to the detected energy function, the method identifies a plurality of energy paths that may include an input energy path corresponding to the energy used or purchased to achieve the detected energy function, an output energy path corresponding to the performance of useful work, a waste energy path corresponding to energy loss, an input signal energy path and an environmental energy path. The method then selects, from the plurality of energy paths, an energy for measurement to detect a contrast between how the product or process is actually performing and how the product or process was intended to perform. The method may obtain these measurements through direct measurement of the selected energy or through indirect measurement of the selected energy via at least one of its component factors. Finally, the method conducts a progressive search on the contrast to identify a feature or property of the product or process responsible for causing the event.

In different embodiments of this aspect of the present invention, the product or process may comprise prototype products or processes, or production products or processes. In the case of a prototype product or process, a feature or property identified by the method of the present invention may correspond to a design under consideration for which a contrast in the direct measurement of the malfunction event is not detected.

In one embodiment of this aspect of the present invention, if no contrast is detected using the plurality of measurements for the first selected energy, a second energy may be selected for measurement from the plurality of energy paths.

In yet another embodiment of this aspect of the present invention, the identified feature or property of the product or process may be changed or controlled to prevent the future occurrence of the event.

In still another embodiment of this aspect of the present invention, the contrast between how the product or process is actually performing and how the product or process is intended to perform is detected by generating a plurality of energy measurements for a second product or process that is not experiencing a malfunction event.

Another aspect of the present invention is an embodiment of a method for identifying evidence of deviation from a specification for a product or process. The method provides a schematic of the product or process which can cover the narrowest scope known to contain the root cause of the event, or, if nothing is known, the entire product or process. The method also detects an energy function of the product or process according to how the product or process manages energy during operation. With respect to the detected energy function, the method identifies a plurality of energy paths. The method then selects, from the plurality of energy paths, an energy for measurement to detect a contrast between how the product or process is actually performing and how the product or process was intended to perform. The method then generates the plurality of measurements for the selected energy. The method next compares the plurality of generated measurements to a respective target range of values and, based on the comparison, infers the existence of an alert condition for the deviation.

Yet another aspect of the present invention is an embodiment of a method for ascertaining the reliability of a product or process. First, the method provides a plurality of samples of a given product or process and exposes those samples to an environmental stress. The method provides a schematic of the product or process which can cover the narrowest scope known to contain the root cause of the event, or, if nothing is known, the entire product or process. The method also detects an energy function of the product or process according to how the product or process manages energy during operation. With respect to the detected energy function, the method identifies a plurality of energy paths. The method then selects, from the plurality of energy paths, an energy for measurement to detect a contrast between how the product or process is actually performing and how the product or process was intended to perform. The method then generates the plurality of measurements for the selected energy. The method next compares the plurality of generated measurements of the plurality of exposed samples to identify a contrast and conducts a progressive search on the contrast to identify a feature or property of the plurality of samples that can be used to control the energy function that is not being achieved. The method also compares the plurality of generated measurements to a plurality of energy measurements of an unstressed product or process and, based on the comparison, infers the useable life of a similar unstressed product or process.

Another aspect of the present invention is a method for diagnosing a cause of a malfunction event in a product or process. The method selects from a plurality of energy paths existing during operation of the product or process, a first energy for measurement to detect a contrast between how the product or process is actually performing and how the product or process is intended to perform. The method conducts a progressive search on the contrast to identify a feature or property of the product or process that can be sued to control an energy function that is malfunctioning. The identified feature or property can then be controlled or changed to prevent future malfunction events.

Still another aspect of the present invention is a diagnostic computer system for determining a cause of an event in a product or process. The diagnostic computer system comprises a processor for detecting a first energy function of the product or process according to how the product or process manages energy during operation and for identifying, for the first energy function, a plurality of energy paths. The diagnostic computer system also comprises a user interface for accepting input from a user and for transmitting the input to the processor over a communications medium. The user selects from the plurality of energy paths, a first energy for measurement to detect a contrast between how the product or process is actually performing an how the product or process is intended to perform. The diagnostic computer system further comprises a sensor system operatively coupled to the processor for generating a plurality of measurements of the selected first energy, a storage device operatively coupled to the processor for storing the plurality of generated measurements, and a display for presenting a schematic of the product or process provided by the processor over the communications medium for viewing by the user. The display may also be configured to present graphic representations of the plurality of generated measurements. The user can operate the diagnostic computer system to conduct a progressive search on the contrast to identify a feature or property of the product or process responsible for causing the event.

An additional aspect of the present invention is an embodiment of a computer-readable medium having stored thereon computer-executable program instructions for diagnosing a cause of an event in a product or process. When executed by a computer processor, the computer-executable program instructions cause the computer processor to perform several diagnostic steps. The method provides a schematic of the product or process which can cover the narrowest scope known to contain the root cause of the event, or, if nothing is known, the entire product or process. The method also detects an energy function of the product or process according to how the product or process manages energy during operation. With respect to the detected energy function, the method identifies a plurality of energy paths. The method then selects, from the plurality of energy paths, an energy for measurement to detect a contrast between how the product or process is actually performing and how the product or process was intended to perform. Finally, the method conducts a progressive search on the contrast to identify a feature or property of the product or process responsible for causing the event.

A further aspect of the present invention is an embodiment of a computer system for training a user to diagnose and apply corrective action to a malfunctioning product or process. The computer system comprises a server with a processor for executing an interactive training program and a client computer coupled to the server via a communications medium. The training program comprises a plurality of downloadable training modules. When executed, the training program identifies a malfunction in a product or process, requires the user to diagnose a cause of the malfunction, and allows the user to download selected training modules. The downloadable training modules are downloaded from the server over the communications medium for access by the user at the client computer.

At least one downloadable training module of the plurality of downloadable training modules trains the user to perform one of several tasks involved in diagnosing a cause of a malfunction in a product or process. The training program includes downloadable training modules that train users to (i) create a schematic of the product or process; (ii) label a plurality of functions performed by the product or process during operation of the product or process according to how the product or process manages energy; (iii) draw, for at least one function of the plurality of functions, a plurality of energy paths; (iv) connect at least two functions of the plurality of functions with respect to a "how" direction, an opposite "why" direction and a perpendicular "when" direction; (v) limit the scope of the schematic to at least one function known to contain a root cause of the event; (vi) select an energy path to measure to determine a contrast between how the product or process actually works and how the product or process is supposed to work; (vii) generate a plurality of measurements of the selected energy paths; (viii) select an alternative energy path for measurement if no contrast is detected; (ix) conduct a progressive search on the contrast to identify a property of the product or process that can be sued to control an energy function not being achieved; or (x) adjust the property to prevent the malfunction.

Other embodiments, objects and advantages of the present invention will be apparent from the following description, the accompanying figures and the appended materials, which are incorporated herein by reference in their entirety.

DETAILED DESCRIPTION

This description, including the figures and any material incorporated herein, describe embodiments that illustrate various aspects of the present invention. These embodiments are not intended to, and do not, limit the scope of the invention to particular details, but provide bases for supporting the claims to the invention. Methods described herein can be implemented using a computer system in an embodiment of the present invention. Furthermore, it may be useful to practice of the invention with the recited steps in a different order from the order provided in the listed methods.

Figure 2A:
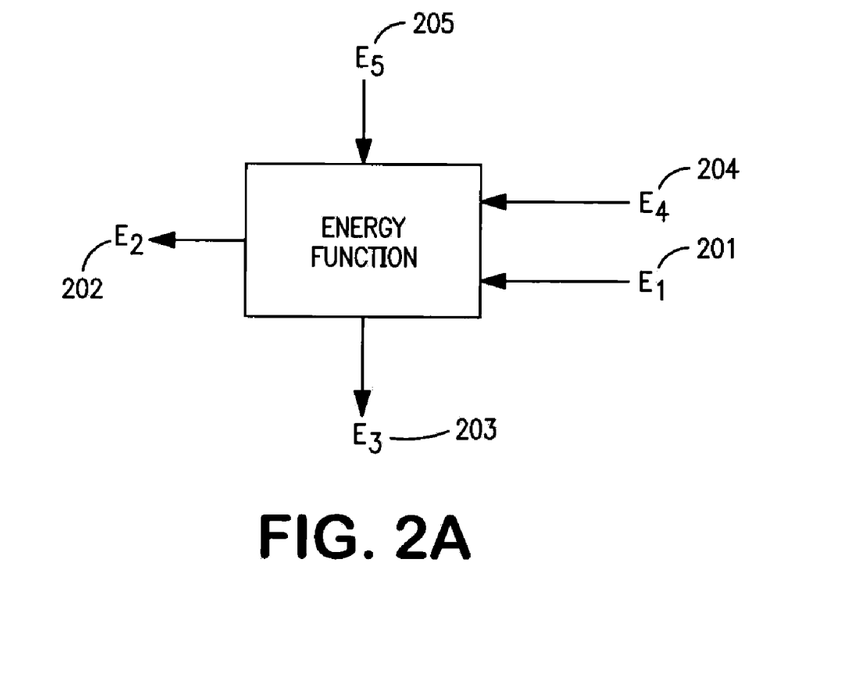
FIG. 2A is an energy function diagram that illustrates five possible energy paths for an energy function performed by a machine.

One aspect of the present invention relates to an embodiment of a method for use in a system for diagnosing the causes of product or process malfunctions. The diagnostic method can reveal potential risks of malfunction in a newly designed product or process. The methods and systems of the present invention use combinations of function models, which describe how a product is supposed to work, and energy accounting principles. The function models are drawn based on how the product or process is supposed to manage energy during operation. Generally, the function models include a box which represents the specific energy function the product or process is intended to perform, an arrow to the right of the box representing the input energy source, an arrow with text to the left of the box representing the useful work performed by the product or process, and an arrow below the box representing the energy losses, or leaks. FIG. 2A illustrates five possible energy paths for an energy function performed by a machine. These energy paths include: (i) the path of input energy used or purchased to achieve the energy function ($E_1$) 201, (ii) the path of output energy for performing useful work, i.e., the work the machine was intended to perform ($E_2$) 202, (iii) the path of waste energy, or energy loss, typically a function of the second law of thermodynamics, while attempting to perform the useful work ($E_3$) 203, (iv) the path of any input signal energy used to direct other energy paths ($E_4$) 204, and (v) the path of any external input energy from the environment ($E_5$) 205.

This method aids in the development of additional measurement systems, beyond the original which signaled the problem in the first place. These additional measurement systems are useful in applying a convergent strategy to narrow the search of potential causes of a malfunction, and in evaluating the malfunction risks of competing designs which do not demonstrate a difference with respect to direct measurement of the malfunction.

Figure 3:
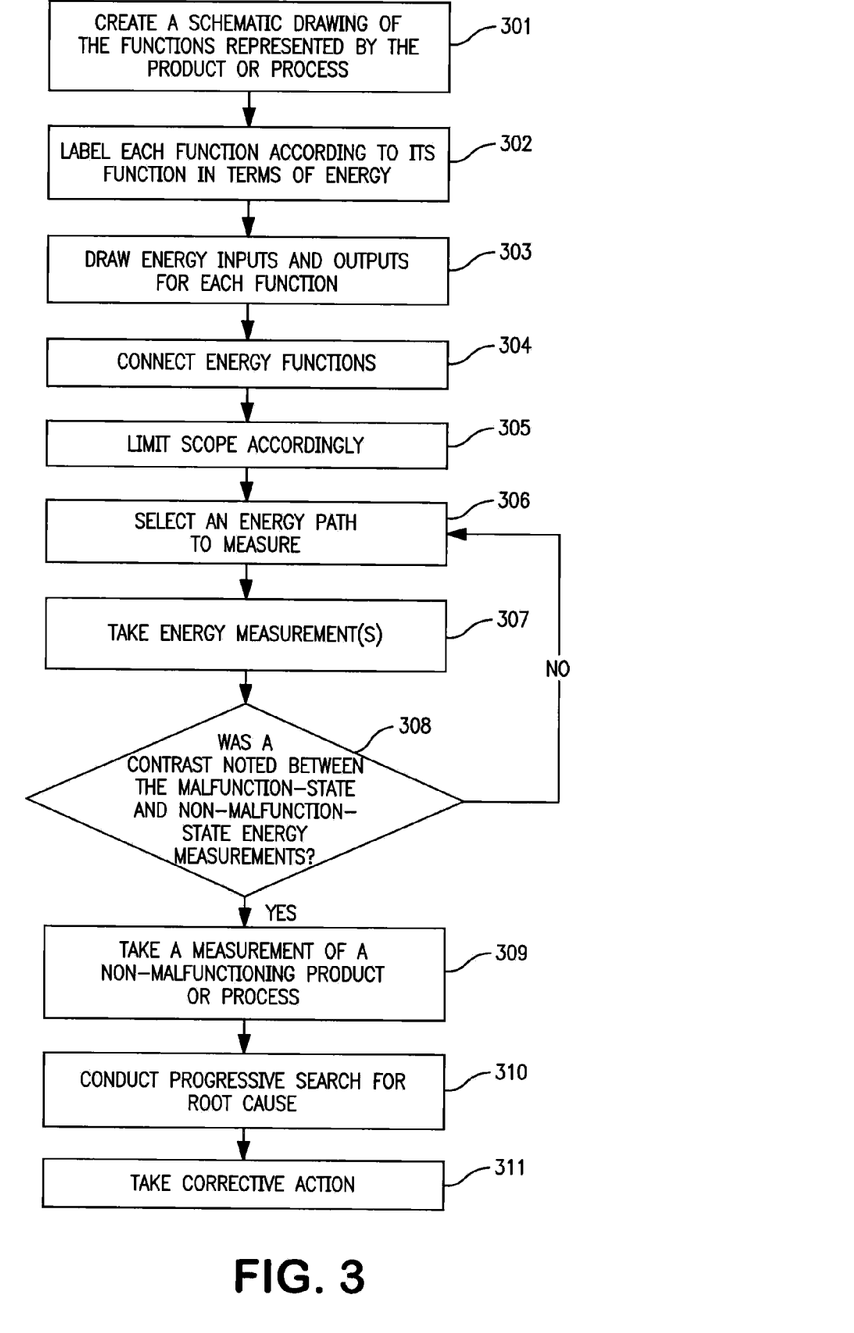
FIG. 3 shows a flow chart for a method of determining a cause of a malfunction event in a prototype or production product or process.

Various embodiments of aspects of the present invention use function models to develop strategies for handling events such as malfunctions (e.g., energy leaks). FIG. 3 shows a flow chart of an embodiment of a diagnostic method for determining a cause of a product or process malfunction event, or other undesirable event, by characterizing how the product or process manages energy. Alternatively, the method may diagnose a cause of the lack of a desirable event. At step 301, a user creates, or otherwise provides, a schematic of the product or process. At step 302, the user labels or assigns each function performed in the operation of the product or process within the scope of the schematic according to how it manages energy. Each energy function includes one of directing energy, transmitting energy, converting energy or containing energy. For each of these energy management functions the user identifies, or labels, the appropriate energy paths at step 303. The energy paths may comprise (i) the path of the input energy used or purchased to achieve the energy function, (ii) the path of the output energy performing the useful work, (iii) the path of energy losses, (iv) the path of any input signal energy, or (v) the path of any input environmental energy.

At step 304, the user connects, or associates, each energy function in relation to each other on the schematic. The connecting of energy functions will relate to a "how" direction (e.g., right), an opposing "why" direction (e.g., left) and a perpendicular "when" direction (e.g., up and down). If appropriate, at step 305 the user limits the schematic to the narrowest scope known to contain the root cause of the malfunction. If nothing is known, the schematic will contain the entire product or process. From the energy paths previously drawn, the user, at step 306, selects an energy for measurement for one of the identified energy functions to show how a product or process is actually performing in contrast to how that product or process was intended to perform. These measurements can be ranked by input energy, output energy, waste energy, signal energy or environmental energy. Alternatively, or additionally, the measurements can be ranked according to contrast criteria specific to the operation of the product or process. At step 307, the user generates a set of energy measurements either directly (i.e., Joules) or indirectly, through its component factors such as force through a distance. The energy measurements may be displayed on a display device such as, though not limited to, a computer monitor or a printer to aid the user in using the measurements to identify a contrast. The energy measurements may also be stored on a computer data storage device. At step 308, following the measurement based on the selected energy path, a user determines whether a contrast has been found. If no contrast is found, the user proceeds back to step 306 to select an alternative energy path for measurement. At step 310 the user conducts a progressive search on the contrast to identify a feature or property of specific components of the product or process that is responsible for the malfunction. Once identified, the user may, at step 311, correct and/or control the appropriate feature or property to prevent future malfunction and control the energy action not properly being achieved.

In one embodiment of the present invention, the contrast between how a product or process is actually performing and how it is intended to perform is identified by making a similar set of energy measurements of a second product or process that is not malfunctioning (309), rather than identifying the contrast within various measurements of the malfunctioning product or process itself.

In yet another embodiment of the present invention, the measurements are made on prototype products or processes, rather than production products or processes. In this embodiment, the features or properties identified refer to competing designs under consideration that do not show any difference in the direct measurement of the malfunction.

Figure 4:
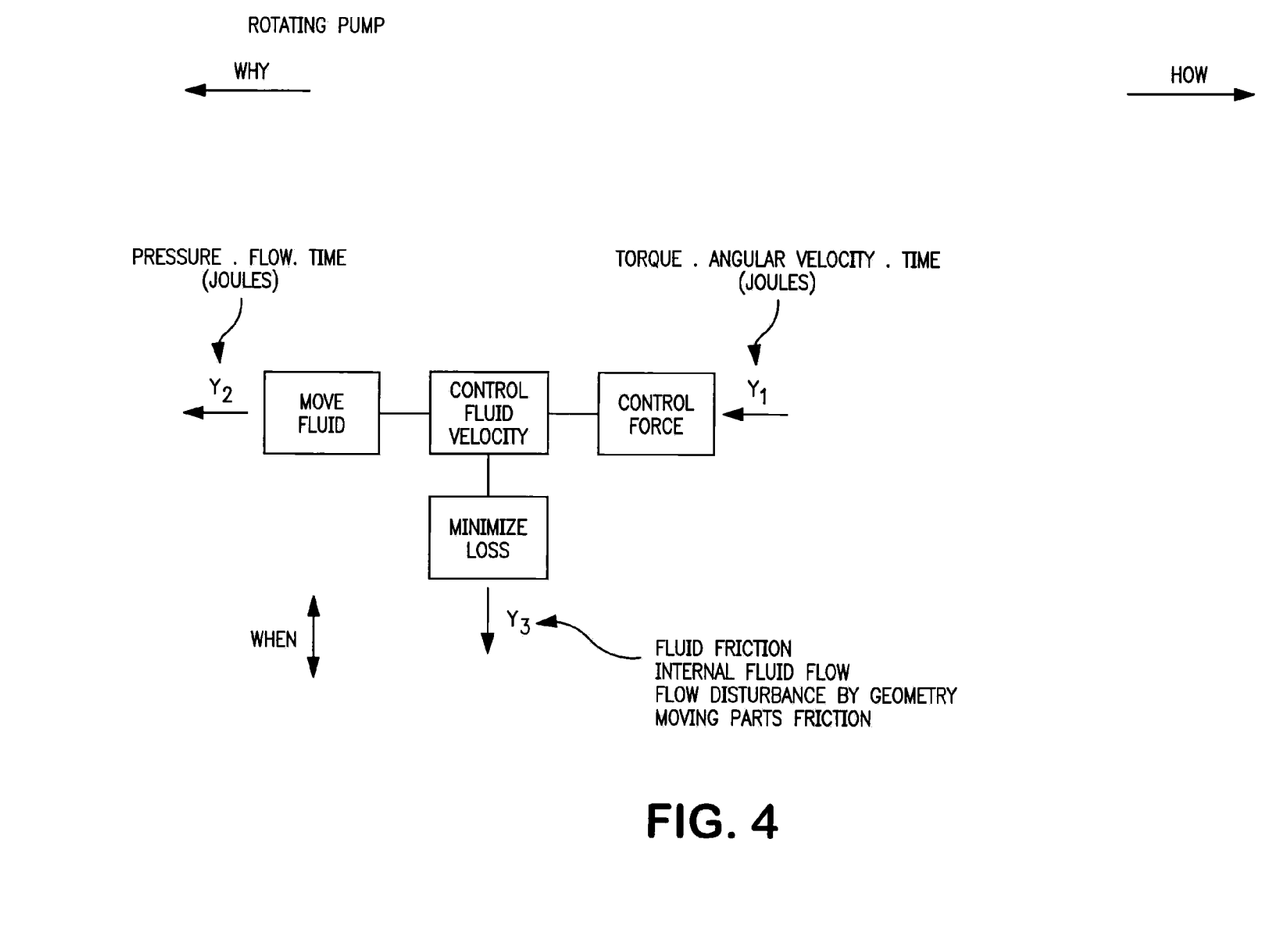
FIG. 4 illustrates an example of a schematic for diagnosing the cause of a malfunction in a rotating pump using the systems and methods of the present invention.

FIG. 4 illustrates an example of a schematic for diagnosing the cause of a malfunction in a rotating pump using the methodology described above with respect to FIG. 3.

Figure 2B:
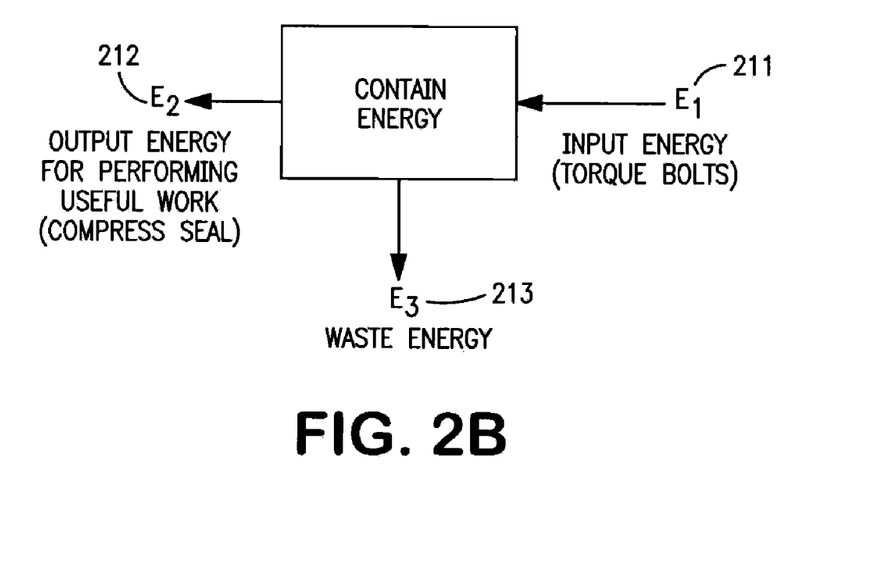
FIG. 2B is an energy function diagram with three relevant energy paths (e.g., input, output, and waste energy) that shows how the bolted flange and seal arrangement of FIG. 1 is managing energy to prevent leaks.
Figure 5A:
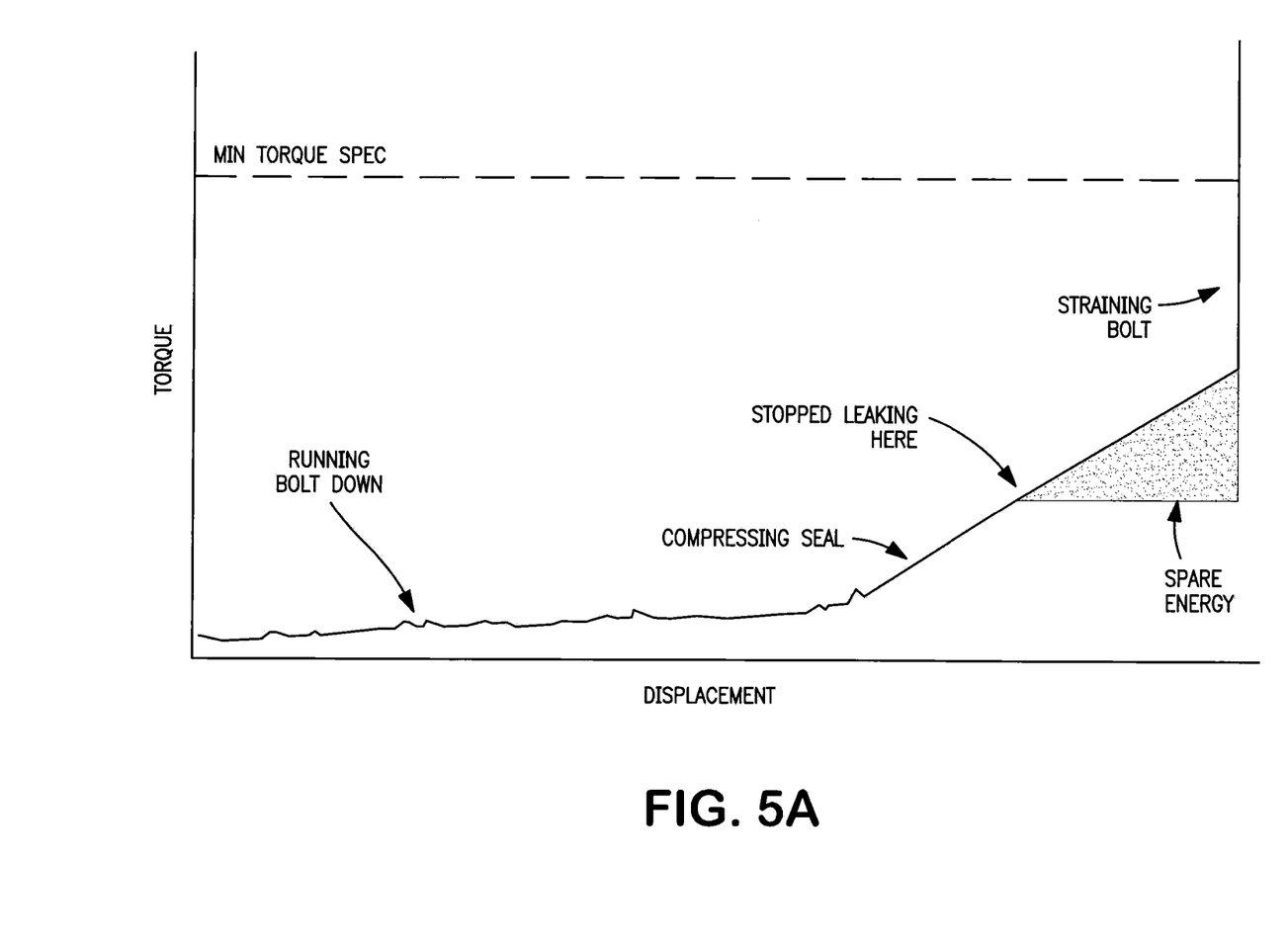
FIG. 5A is a graphical representation of the actual measurements of a well performing bolted flange and seal arrangement of FIG. 1, specifically representing the torque and angle of turn of the bolts, the point at which the system stopped leaking, and the spare energy available in the system to resist leaking.
Figure 5B:
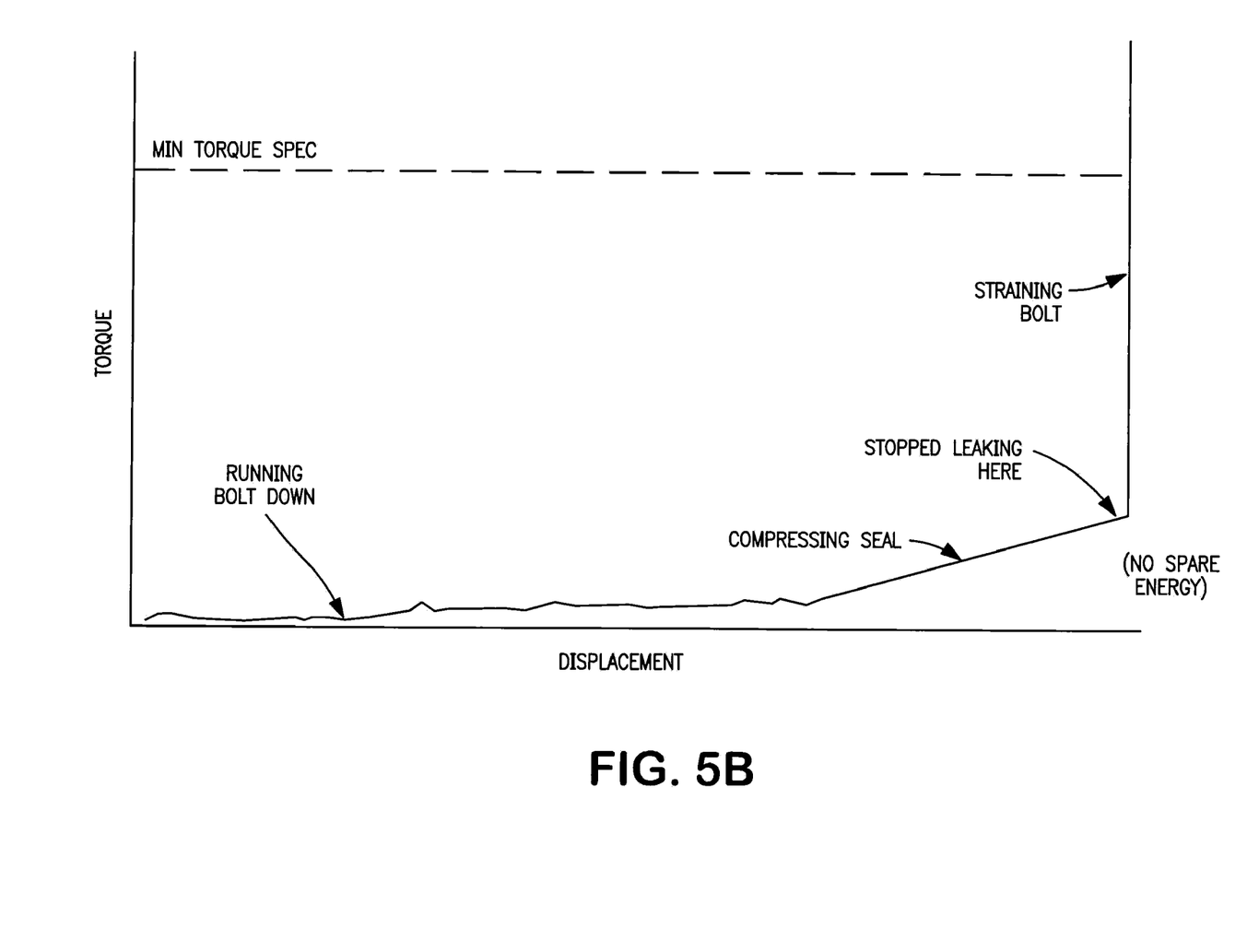
FIG. 5B is a graphical representation of the actual measurements of a poorly performing bolted flange and seal arrangement of FIG. 1, specifically representing the torque and angle of turn of the bolts, the point at which the system stopped leaking, and the lack of spare energy available in the system to resist leaking.

Using the method outlined above, in the example of a fluid leak in a bolted flange and seal arrangement (FIG. 1), an energy function model of how the arrangement performs its intended function of containing fluid is provided (FIG. 2B). The energy paths of the input energy 211 (i.e., bolt torque through some angle of turn), output energy 212 (i.e., compression of a seal), and waste energy 213 (i.e., friction in the threads) are identified and quantified. The possible energy measurements are considered based on their ability to show a contrast between how the system is actually performing relative to how it is supposed to perform. In this example, the input energy is chosen to reveal this contrast. The input energy measurements can be represented graphically as shown in FIG. 5A, allowing for the calculation of spare energy stored in the compressed seal. The spare energy is represented as the area under the torque x displacement curve from the point at which the system stops leaking to the minimum torque limit, resulting in an estimate of the system's ability to resist the specific malfunction at hand, leakage. By measuring the input energy (i.e., torque and angle of turn), it is also possible to see the effects of the various components of the system, such as friction in the threads as the bolt is run down, compression of the seal and stretching of the bolt. This measurement can be used to contrast the variability between similar systems, none of which have actually leaked under the specified torque requirements. FIG. 5B shows the measurements of a poorly performing system. Using this now apparent contrast, a progressive search can be conducted to determine which the feature or property which is the true cause of the variation of spare energy. Once identified, this feature can be changed or controlled to prevent similar products or processes from experiencing this malfunction. Neither of the two systems shown in FIGS. 5A and 5B experienced a leak at the required torque value, thus detection of a difference with conventional approaches (i.e., leak or no leak) would not have been possible.

In another embodiment of an aspect of the present invention, a method for identifying evidence of deviation from a specification in a product or process, such as a manufacturing process, is provided. This deviation may give rise to an alert condition in the product or process. An alert condition can be any condition recognized for the product or process as one that may trigger an observation or other response from an entity with responsibility for at least some aspect of the process. An alert condition may be inferred, for example, if a deviation exceeds a defined threshold based on a preselected rule. The rule may vary depending upon the input energy required to achieve a specific function. For example, for a product with a bolted flange seal arrangement, the rule may say that the test limits of the input bolt torque and angle of turn required to turn off a fluid leak are below a certain energy threshold, thus assuring adequate spare energy to resist malfunctions once put into application. Products not meeting the minimum specification can be rejected, and attention can be given to determining the feature or property of the specific component responsible for the rejection using the process outlined below.

Figure 6:
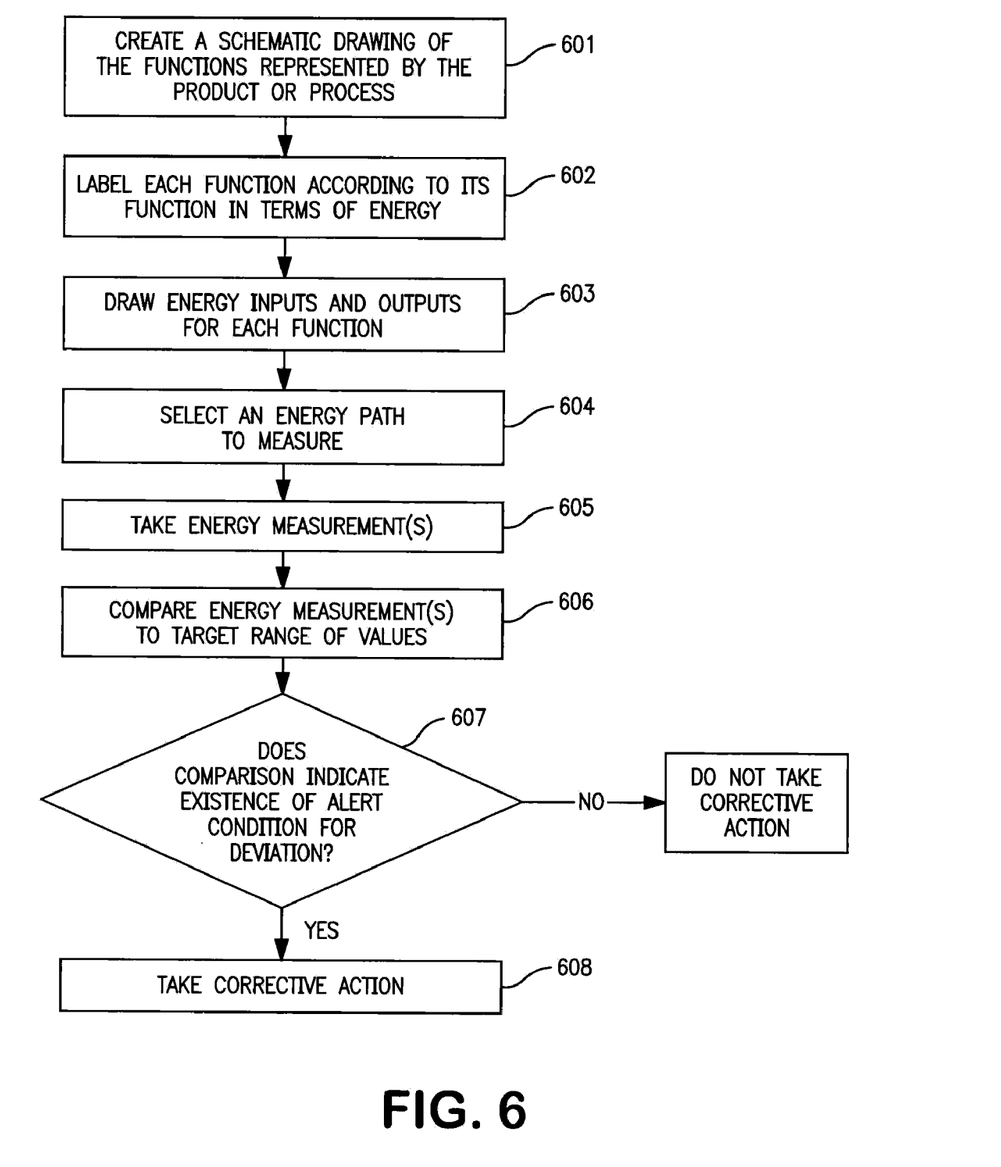
FIG. 6 shows a flow chart for a method of identifying evidence of deviation from a specification for a product or process.

FIG. 6 shows a flow chart of an embodiment of a method for identifying evidence of deviation from a specification for a product or process. At step 601 a user creates, or otherwise provides, a schematic of the product or process within the narrowest scope known to contain the root cause of the malfunction. If nothing is known, the schematic will contain the entire product or process. At step 602, the user labels or assigns each function in the operation of the product or process within the scope of the schematic according to how it manages energy. Each energy function includes one of directing energy, transmitting energy, converting energy or containing energy. For each of these energy functions the user identifies, or labels, at step 603, the appropriate energy paths. The energy paths may comprise (i) the path of the input energy used or purchased to achieve the energy function, (ii) the path of the output energy performing the useful work, (iii) the path of energy losses, (iv) the path of any input signal energy, or (v) the path of any input environmental energy.

The user then connects, or associates, each energy function in relation to each other on the schematic. The connecting of energy functions will relate to a "how" direction (e.g., right), an opposing "why" direction (e.g., left) and a perpendicular "when" direction (e.g., up and down). From the energy paths previously drawn, the user selects, at step 604, an energy for measurement to show how a product or process is working in contrast to how that product or process is supposed to work. At step 605, the user generates a set of energy measurements either directly (i.e., Joules) or indirectly, through its component factors such as force through a distance. At step 606 the user compares each set of measurements to a respective target range of values and, at step 607, based on the comparison, infers the existence of evidence of an alert condition for the deviation. In an embodiment of this aspect of the present invention, a computer system may transmit a signal indicative of an alert condition for the deviation to notify the user that corrective action is needed. If an alert condition exists, the user can then take appropriate corrective action (608). Data relating to the existence of the alert condition may be stored on a computer data storage device or displayed on a display device including, though not limited to, a computer monitor or printer.

Figure 7:
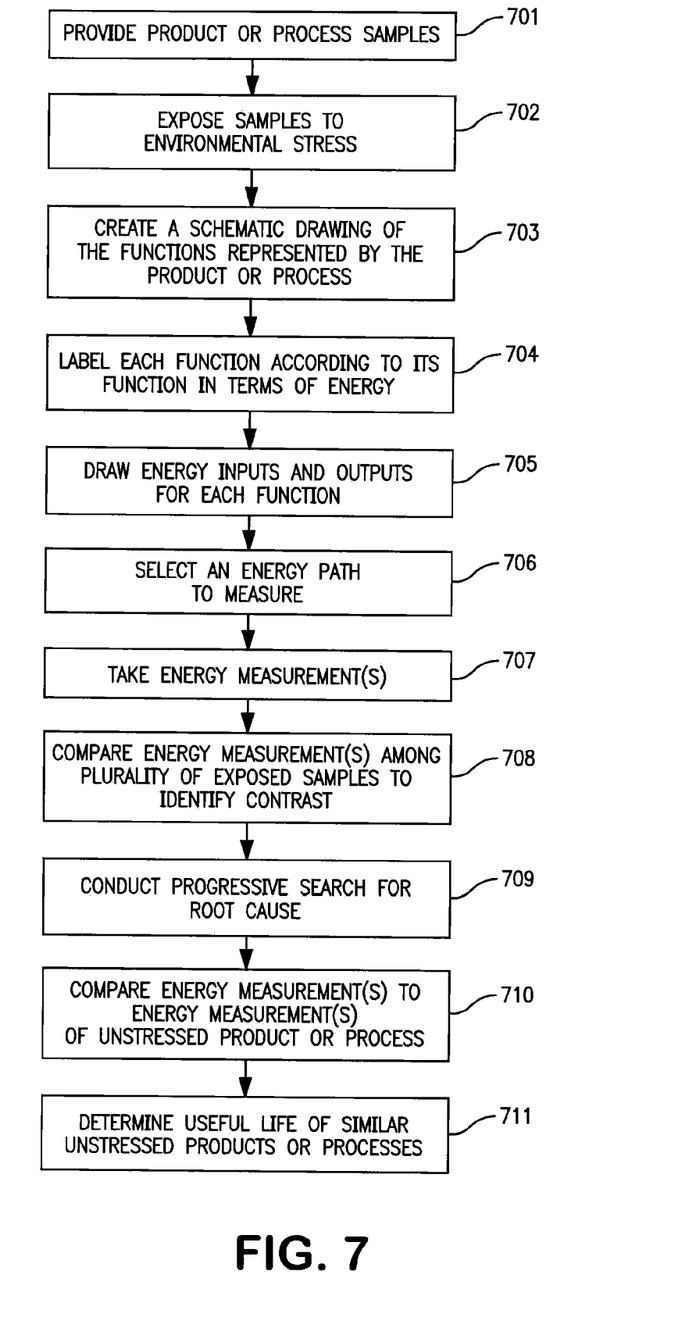
FIG. 7 shows a flow chart for a method of ascertaining the reliability of a product or process.

FIG. 7 shows a flow chart of an embodiment of a method for ascertaining the reliability of products or processes exposed to an environmental stress. At step 701, a user creates, or otherwise provides, a set number of samples of a given product. At step 702, the user then exposes the sample products to the appropriate stresses and environments likely to be experienced during the products' intended applications, either through a series of tests or actual field use.

At step 703, the user creates, or provides, a schematic of the product or process within the narrowest scope known to contain the root cause of the potential malfunction. If nothing is known, the schematic will contain the entire product or process. At step 704, the user labels or assigns each function in the operation of the product or process within the scope of the schematic according to how it manages energy. Each energy function includes one of directing energy, transmitting energy, converting energy or containing energy. For each of these energy functions the user identifies, or labels, at step 705, the appropriate energy paths. The energy paths may comprise (i) the path of the input energy used or purchased to achieve the energy function, (ii) the path of the output energy performing the useful work, (iii) the path of energy losses, (iv) the path of any input signal energy, or (v) the path of any input environmental energy.

The user may then connect, or associate, each energy function in relation to each other on the schematic. The connecting of energy functions will relate to a "how" direction (e.g., right), an opposing "why" direction (e.g., left) and a perpendicular "when" direction (e.g., up and down). From the energy paths previously drawn, at step 706, the user selects an energy for measurement to show how a product or process is working in contrast to how that product or process is supposed to work. At step 707, the user generates a set of energy measurements either directly (i.e., Joules) or indirectly, through its component factors such as force through a distance. These measurements may be taken on prototype products or processes, or on production products or processes. At step 708, the user compares each set of measurements for all the exposed products tested to identify contrasts, or variations.

At step 709, the user uses the measurements to conduct a progressive search on the contrasts to identify a feature or property of specific components of the product or process responsible for the malfunction. Once identified, the user may correct and/or control the appropriate feature or property to prevent future malfunction and may control the energy action not properly being achieved. At step 710, the user compares each set of measurements to energy measurements of an unstressed product or process and, at step 711, based on this comparison, infers the useable life of similar unstressed products or processes. Data relating to the inferred useable life of similar unstressed products or processes may be stored on a computer data storage device. This data may also be displayed on a display device including, though not limited to, a computer monitor or printer.

Using the method outlined above, in the example of the fluid leak in the bolted flange and seal arrangement previously described (FIGS. 1 and 2B), the input energy 211 (i.e., bolt torque through some angle of turn), output energy 212 (i.e., compression of a seal), and waste energy 213 (i.e., friction in the threads) are identified and quantified. The measurements can be represented graphically as shown in FIG. 5A, allowing for the calculation of spare energy stored in the compressed seal and resulting in an estimate of the system's ability to resist the specific malfunction at hand, leakage. By measuring the input energy (i.e., torque and angle of turn), for example, it is also possible to detect the effects of the various components of the system, such as friction in the threads as the bolt is run down, compression of the seal and stretching of the bolt. This measurement can be used to contrast the variability between new and degraded systems (i.e., product at the start of the test and end of the test), none of which have actually leaked under the specified torque requirements. FIG. 5B shows the measurements of a poorly performing, degraded system. Using this now apparent contrast, a progressive search can be conducted to determine the feature or property which is the true cause of the variation. Once identified, this feature can be changed or controlled to prevent similar products or processes from experiencing this malfunction. Neither of the two systems shown in FIGS. 5A and 5B experienced a leak at the required torque value, thus detection of a difference with conventional approaches (i.e., leak or no leak) would not have been possible.

Another aspect of the invention provides for systems and methods of training users to accomplish the methods described herein with respect to other embodiments of various aspects of the present invention. A training method presents portions of the diagnostic method with actual or theoretical examples of its use to groups of trainees in a conference room or classroom setting. Each trainee, either individually or in teams, is assigned a specific problem. The system then provides a qualified coach to guide the trainees through the solution of the problem. A written description of the diagnostic method as applied to the assigned problem is prepared which includes the detailed solution and the steps required to implement the solution by the trainee or trainee team to solve the problem. The qualified coach then reviews, in detail, the written description and interviews the trainee, either individually or as part of the team, to determine the depth of understanding of the diagnostic method.

In one embodiment of this aspect of the present invention the training method is implemented in a computer system comprising a computer or computers coupled with a network wherein the trainee participates either interactively or through downloadable modules. In a preferred embodiment the computer system comprises a server with a processor for executing an interactive training program and a client computer coupled to the server via a communications medium. The training program comprises a plurality of downloadable training modules. When executed, the training program identifies a malfunction in a product or process, requires the user to diagnose a cause of the malfunction, and allows the user to download selected training modules. The downloadable training modules are downloaded from the server over the communications medium for access by the user at the client computer.

At least one downloadable training module of the plurality of downloadable training modules trains the user to perform one of several tasks involved in diagnosing a cause of a malfunction in a product or process. The training program includes downloadable training modules that train users to (i) create a schematic of the product or process; (ii) label a plurality of functions performed by the product or process during operation of the product or process according to how the product or process manages energy; (iii) draw, for at least one function of the plurality of functions, a plurality of energy paths; (iv) connect at least two functions of the plurality of functions with respect to a "how" direction, an opposite "why" direction and a perpendicular "when" direction; (v) limit the scope of the schematic to at least one function known to contain a root cause of the event; (vi) select an energy path to measure to determine a contrast between how the product or process actually works and how the product or process is supposed to work; (vii) generate a plurality of measurements of the selected energy paths; (viii) select an alternative energy path for measurement if no contrast is detected; (ix) conduct a progressive search on the contrast to identify a property of the product or process that can be sued to control an energy function not being achieved; or (x) adjust the property to prevent the malfunction.

In another embodiment of the present invention, a method for diagnosing a cause of a malfunction event in a product or process comprises conducting a progressive search on a contrast to identify a feature or property of the product or process that can be used to control an energy function not being achieved. The identified feature or property can then be corrected and/or controlled to prevent future malfunctions.

The systems and methods of the present invention can be applied to catastrophic failures (i.e., something breaks or is permanently altered because of how energy was managed) as well as malfunction-type failures (i.e., the desired performance is not achieved).

The systems and methods of the present invention can be applied at different scopes, from entire systems, to components that make up a system, to individual features or properties of a product or process.

In various embodiments of the present invention, the energy measurements described herein are stored in a computer data storage device.

In various embodiments of the present invention, methods described herein may also be performed by a computer with or without a user.

Figure 8:
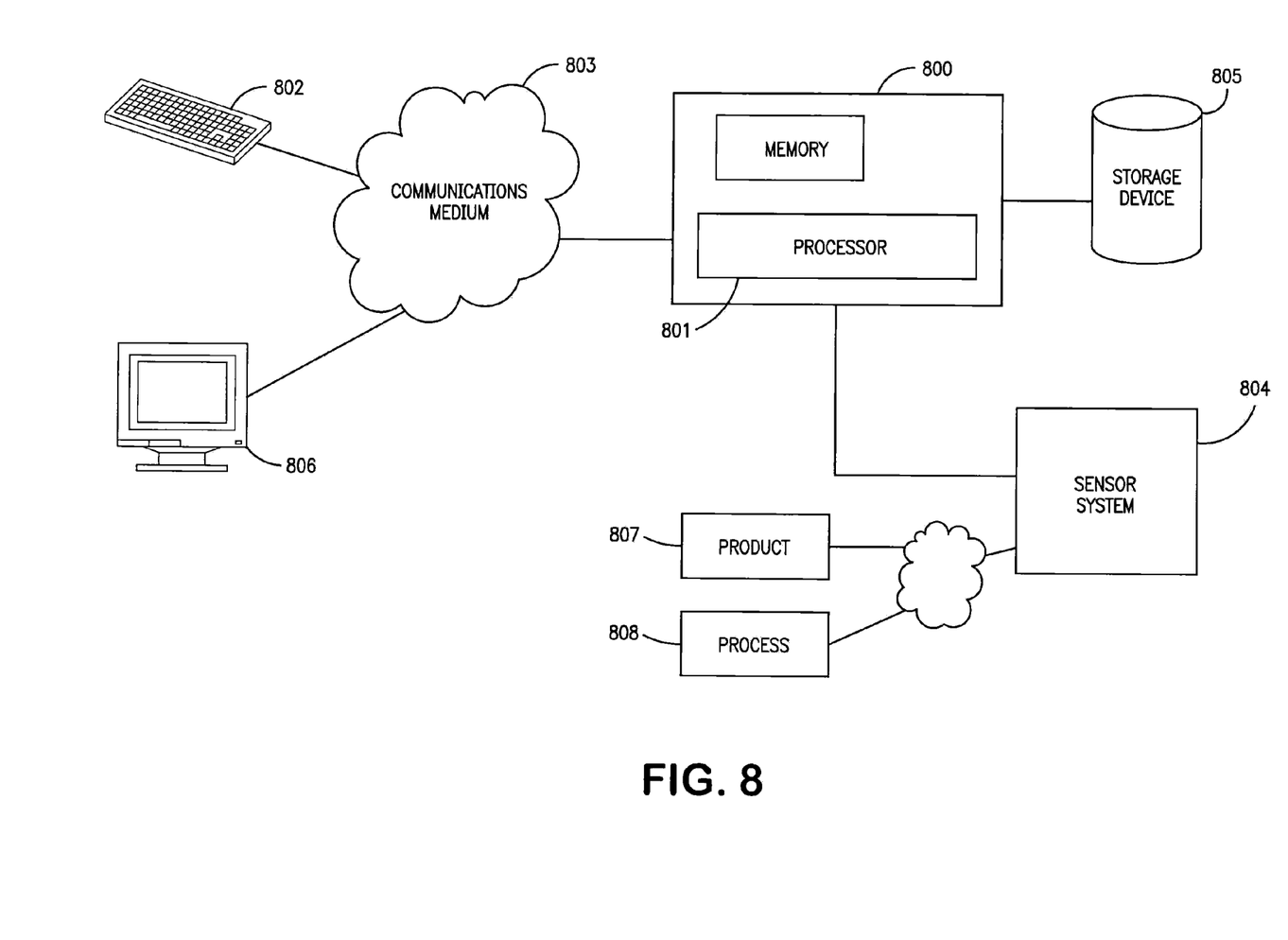
FIG. 8 is a schematic of a diagnostic computer system for performing the methods of the present invention.

FIG. 8 provides a schematic of a diagnostic computer system for determining a cause of an event in a product or process according to the methods of the present invention. The diagnostic computer system comprises a processor 801 on a server 800 for detecting a first energy function of the product 807 or process 808 according to how the product 807 or process 808 manages energy during operation and for identifying, for the first energy function, a plurality of energy paths. The diagnostic computer system also comprises a user interface 802 for accepting input from a user (e.g., a keyboard) and for transmitting the input to the processor 801 over a communications medium 803. The user selects from the plurality of energy paths, a first energy for measurement to detect a contrast between how the product 807 or process 808 is actually performing and how the product or process is intended to perform. The diagnostic computer system further comprises a sensor system 804 operatively coupled to the server 800 for generating a plurality of measurements of the selected first energy, a storage device 805 operatively coupled to the processor for storing the plurality of generated measurements, and a display 806 for presenting a schematic of the product or process provided by the processor over the communications medium for viewing by the user. The display 806 may also be configured to present graphic representations of the plurality of generated measurements. The user can operate the diagnostic computer system to conduct a progressive search on the contrast to identify a feature or property of the product 807 or process 808 responsible for causing the event.

Systems according to the present invention, such as are shown in FIG. 8, may comprise any type of conventional computer system and operating system. The aspects of the present invention may be practiced using any suitable, conventionally available input, display and data storage devices and may also include an optional communications access device such as a modem, network interface card or port, or wireless transmitter for providing computer-to-computer communication capabilities. It may further involve a web server that would provide connectivity to a network such as an intranet, extranet, or the Internet, allowing for remote access to the software supporting the methods of the present invention. In such a case, a client device may run any suitable web browsing programs or other software that would permit a user to access the network. The system may also include additional software components that would allow a user to view data and information in a range of formats.

The instruction set that is used to direct a system to perform functions according to the present invention may be present as software in memory or implemented as hardware or firmware. The instruction set may be written in any computer language or combination of languages selected by a service provider, coder or programmer. The instruction set may also be a macro or template in a spreadsheet, or a custom-designed and implemented application. A service provider may also choose to implement the invention as an applet within a web page. Other suitable approaches may be used.

A service provider on a publicly-accessible site, location, or web page, or on a restricted-access site may host the invention. A user may, for example, access the software by running a web browser on a client device and entering a uniform resource locator ("URL") corresponding to the web address of a server system, which may be running a web server which then allows access to the software application.

While the invention has been shown and described with reference to particular embodiments, those skilled in the art will understand that various changes in form and details of the methods according to the present invention may be made without departing from the spirit and scope of the invention.

All aspects of this invention that involve recording, transmitting, modifying, updating, manipulating, calculating, displaying and reporting information, and all other associated processing, can be performed on one or more computing devices that may be coupled by one or more networks, which may be the public internet, wide-area and/or local networks, public and/or private.

Specific arrangements and embodiments described above provide examples of the principles covered by the appended claims and their equivalents, but also include many other embodiments and variations, as well as objects and advantages, that may not be explicitly described in this document but that would nevertheless, be appreciated by those skilled in the field of this invention. For example, but without limitation, structural or functional elements might be rearranged, or method steps reordered, consistent with the present invention. Similarly, processors or databases may comprise a single instance or a plurality of devices coupled by network, databus or other information path. Similarly, principles according to the present invention, and systems and methods that embody them, could be applied to other examples, which, even if not specifically described here in detail, would nevertheless be within the scope of the appended claims.

What is claimed is:

1. A computer-implemented diagnostic method for determining a cause of an event in a product or process according to an energy function model, the method comprising:
    using at least one processor to perform the steps of:
        receiving a signal from a first measurement system indicating the event in the product or process;
        displaying, on a display device, a schematic of a function model of the product or process, the function model comprising a plurality of functions describing actions designed to be performed in the operation of the product or process, the function model further identifying dependencies between the plurality of functions to describe how, why, and when respective actions are performed;
        converting the function model to an energy function model by performing, using the at least one processor, the steps of:
            (a) assigning, to each of the plurality of functions, an energy function according to an energy action describing how the particular function of the product or process uses energy during operation;
            (b) identifying, for a first energy function, a plurality of energy paths within the product or process;
            (c) displaying, on the schematic, the energy functions and a representation of the plurality of energy paths shown with respect to a displayed how direction, an opposing why direction, and a perpendicular when direction corresponding to the dependencies between the plurality of functions; and
            (d) associating the first energy function with a second energy function by displaying, on the schematic, a connection between at least one of the plurality of energy paths for the first energy function and the second energy function according to an energy relationship between the first energy function and the second energy function to define the energy function model so as to account for energy within the product or process during operation;
        selecting, from among the plurality of energy paths, a measurement energy for detecting a contrast between how the product or process is actually using energy and how the product or process is intended to use energy;
        generating a plurality of measurements of the selected measurement energy using a second measurement system that is different than the first measurement system that indicated the event in the product or process;
        displaying the plurality of measurements on the display device to identify the contrast; and
        conducting a progressive search on the contrast to identify a feature or property of the product or process responsible for causing the event.

2. The diagnostic method according to claim 1, wherein the event comprises a malfunction event.

3. The diagnostic method according to claim 1 further comprising the step of limiting the schematic to the narrowest scope known to contain the root cause of the event.

4. The diagnostic method according to claim 1, wherein the first energy function comprises a function for directing energy.

5. The diagnostic method according to claim 1, wherein the first energy function comprises a function for transmitting energy.

6. The diagnostic method according to claim 1, wherein the first energy function comprises a function for converting energy.

7. The diagnostic method according to claim 1, wherein the first energy function comprises a function for containing energy.

8. The diagnostic method according to claim 1, wherein at least one energy path of the plurality of energy paths comprises an input energy path corresponding to energy used to achieve the assigned first energy function.

9. The diagnostic method according to claim 1, wherein at least one energy path of the plurality of energy paths comprises an output energy path corresponding to the performance of useful work.

10. The diagnostic method according to claim 1, wherein at least one energy path of the plurality of energy paths comprises a waste energy path corresponding to energy loss.

11. The diagnostic method according to claim 1, wherein at least one energy path of the plurality of energy paths comprises an input signal energy path.

12. The diagnostic method according to claim 1, wherein at least one energy path of the plurality of energy paths comprises an environmental energy path.

13. The diagnostic method according to claim 1, wherein the plurality of generated measurements comprises direct measurements of the selected energy.

14. The diagnostic method according to claim 1, wherein the plurality of generated measurements comprises indirect measurements of the selected energy through at least one of its component factors.

15. The diagnostic method according to claim 1 further comprising the step of controlling the identified feature or property to prevent a future occurrence of the event.

16. The diagnostic method according to claim 2, wherein the contrast between how the product or process is actually performing and how the product or process is intended to perform is detected by generating a plurality of energy measurements for a second product or process that is not experiencing a malfunction event.

17. The diagnostic method according to claim 2, wherein the product or process comprises a prototype product or process.

18. The diagnostic method according to claim 17, wherein the identified feature or property corresponds to a design under consideration for which a contrast in the direct measurement of the malfunction event is not detected.

19. The diagnostic method according to claim 1, wherein the product or process comprises a production product or process.

20. The diagnostic method according to claim 1 further comprising the step of storing the plurality of generated measurements in a computer data storage device.

21. The diagnostic method according to claim 1, wherein selecting the measurement energy comprises:
    selecting a first energy;
    generating one or more first measurements of the selected first energy in the product or process;

based on the one or more first measurements, determining that the contrast is not detected by measuring the first energy;

in response to determining that the contrast is not detected by measuring the first energy, selecting a second energy;

generating one or more second measurements of the selected second energy in the product or process;

based on the one or more second measurements, determining that the contrast is detected by measuring the second energy; and assigning the second energy as the measurement energy.

22. A computer-implemented method for diagnosing and applying corrective action to a malfunctioning product or process according to an energy function model, the method comprising:

using one or more processors to perform the steps of:

receiving a signal from a first measurement system indicating the event in the product or process;

selecting from among a plurality of energy paths existing during operation of the product or process, a first energy for measurement to detect a contrast between how the product or process is actually using energy and how the product or process is intended to use energy, wherein the energy function model defines the plurality of energy paths associated with respective energy functions of the product or process, wherein the respective energy functions describe how the product or process is intended to use energy during operation, and wherein the one or more processors displays on a display device a representation of at least one of the plurality of energy paths connecting two or more of the respective energy functions along a displayed how direction, an opposing why direction, and a perpendicular when direction corresponding to dependencies between the two or more respective functions so as to account for energy within the product or process during operation;

conducting a progressive search on the contrast to identify a feature or property of the product or process that can be used to control an energy function that is malfunctioning; and controlling the identified feature or property to prevent future malfunctions.

23. The method according to claim 22, wherein the contrast between how the product or process is actually performing and how the product or process is intended to perform is detected by generating a plurality of energy measurements for a second product or process that is not experiencing a malfunction event.

24. The method according to claim 22, wherein the product or process comprises a prototype product or process.

25. The method according to claim 24, wherein the identified feature or property corresponds to a design under consideration for which a contrast in the direct measurement of the malfunction event is not detected.

26. The method according to claim 22, wherein the product or process comprises a production product or process.

27. A non-transitory computer-readable medium having stored thereon computer-executable program instructions for diagnosing a cause of an event in a product or process according to an energy function model, the computer-executable program instructions, when executed by a computer processor, causing the computer processor to perform the steps of:

receiving a signal from a first measurement system indicating the event in the product or process;

displaying, on a display device, a schematic of a function model of the product or process, the function model comprising a plurality of functions describing actions designed to be performed in the operation of the product or process, the function model further identifying dependencies between the plurality of functions to describe how, why, and when respective actions are performed;

converting the function model to an energy function model by performing, using the computer processor, the steps of:

(a) assigning, to each of the plurality of functions, an energy function according to an energy action describing how the particular function of the product or process uses energy during operation;

(b) identifying, for a first energy function, a plurality of energy paths within the product or process;

(c) displaying, on the schematic, the energy functions and a representation of the plurality of energy paths shown with respect to a displayed how direction, an opposing why direction, and a perpendicular when direction corresponding to the dependencies between the plurality of functions; and (d) associating the first energy function with a second energy function by displaying, on the schematic, a connection between at least one of the plurality of energy paths for the first energy function and the second energy function according to an energy relationship between the first energy function and the second energy function to define the energy function model so as to account for energy within the product or process during operation;

selecting, from among the plurality of energy paths, a measurement energy for detecting a contrast between how the product or process is actually using energy and how the product or process is intended to use energy;

generating a plurality of measurements of the selected measurement energy using a second measurement system that is different than the first measurement system that indicated the event in the product or process; and conducting a progressive search on the contrast to identify a feature or property of the product or process responsible for causing the event.

\* \* \* \* \*